United States Patent Office 3,204,363
Patented Sept. 7, 1965

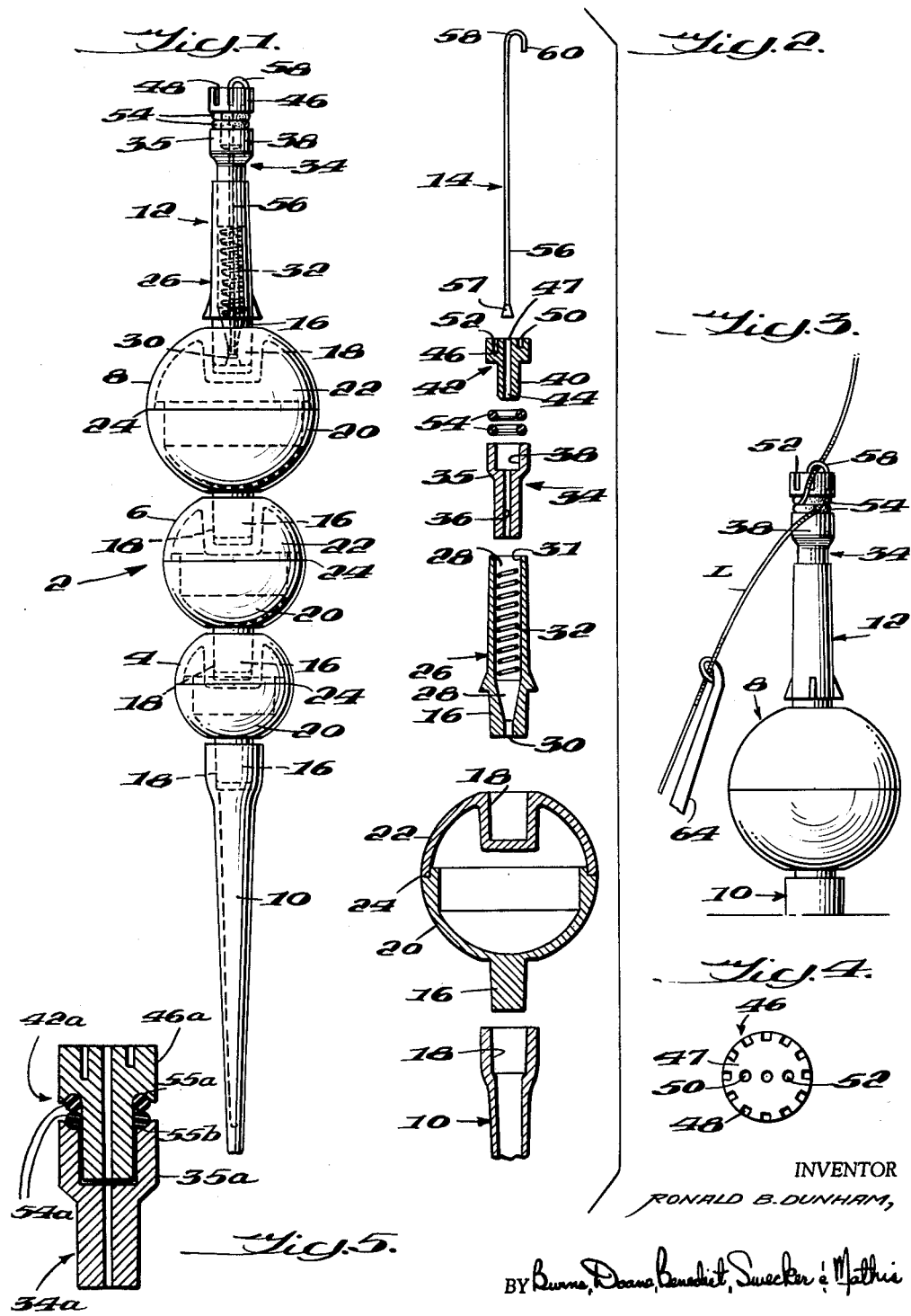

3,204,363
FISHING FLOATS
Ronald B. Dunham, 29069 Sharidale, Southfield, Mich.
Filed Aug. 9, 1963, Ser. No. 300,972
3 Claims. (Cl. 43—43.14)

This invention relates to buoyant bodies and more particularly to an improved fishing float of the type permitting variation of the buoyant action thereof and still more particularly, to floats having means for adjustably clamping or slidably attaching the float to a fishing line.

In utilizing fishing floats, there is often a need to vary the weight and degree of buoyancy of the float to achieve a desired buoyant effect in accordance with the demands of the weight of a bait, prevailing surface and current conditions, and convenience in casting. Further, since the positioning of the float relative to the bait depends upon the depth of the water being fished, it is often necessary to change the location of the float assembly relative to the bait. It will be appreciated that if the float is anchored on the line at a distance greater than the length of the fishing rod from the bait, difficulty is experienced in landing a fish and in manipulation of the rig in general. This stems from the fact that if the float is fixedly anchored to the line, upon reeling in, the float contacts the rod tip and prohibits further reeling, thereby making it inconvenient to draw the fish as close to the rod tip as may be desirable for landing purposes.

Heretofore, various types of fishing floats have been proposed to permit adjusting the buoyant action of the float assembly and to facilitate reeling-in of the line to the degree required for convenience in landing fish. However, such floats have not proven to be entirely satisfactory because of the elaborate and expensive mechanism provided to vary the buoyancy and because the means provided for adjustably clamping and slidably attaching the float to the line often induced, in operation, damage to the fishing line.

It is an object of this invention to provide a fishing float that is simple and yet readily adjustable as to buoyant effect and positioning along the fishing line.

It is a further object of this invention to provide such a float with line anchoring means that will not damage the fishing line during operation.

According to a preferred embodiment of my invention, there is provided a plurality of detachably connected buoyant float members of graduated size and a line anchoring assembly connected thereto, the elements of the float being connected by connecting means of a type permitting adding or subtracting float members to thereby vary the buoyant action of the float. The line anchoring assembly of this invention includes a line clamping assembly which may be utilized in fixedly anchoring the float to a line but also includes means to facilitate adjustment there along selectively, or automatically when the float strikes the rod tip during reeling-in. Further this float includes resilient cushioning means interposed between the line and the clamping elements of the anchoring assembly to insulate the fishing line from possible abrasions.

This preferred embodiment of my invention is illustrated in the accompanying drawings in which:

FIGURE 1 is a side view of a fishing float constructed in accordance with my invention;

FIGURE 2 is an exploded sectional view of the float shown in FIGURE 1 but with several of the float members removed and the anchor assembly disassembled; and FIGURE 3 is a view of the float shown in FIGURE 1 attached to a line and shown adjacent a fishing rod tip; and FIGURE 4 is an enlarged view of a face of a plunger cap of the float shown in FIGURE 1; and FIGURE 5 is an enlarged sectional view of a modified form of a plunger and sleeve member of this invention.

In carrying out this invention a float assembly 2 comprising a plurality of hollow plastic bouyant spheres, 4, 6, and 8 of a graduated size is provided. Attached to the sphere 4 at one extremity of the float assembly 2 is a elongated mast 10. Attached to the sphere 8 at the other extremity of the float assembly 2 is a line anchor assembly 14 having a hook member 14 permitting adjustable clamping or sliding connection to a fishing line L. For connecting these elements of the float, there is provided on each of the spherical float members 4, 6 and 8 and on the anchor assembly 12 a slightly tapered stud 16. Provided at the other extremity of each spherical float members 4, 6 and 8 and on one extremity of the mast 10 is a slightly tapered recess 18. The taper of the studs and recesses is approximately 0.600 inch per foot providing a connection of the self-holding type, such as the Jarno, Morse or Brown and Sharpe tapers. In this manner, a simple connection is achieved whereby the float assembly may not be accidentally disassembled by an axial pull. Rather, the disassembly of such a tapered connection requires an axial pull plus a twist and thereby insures against accidental disassembly. Of course, the usual threaded connection or the like could be utilized instead of the tapered connectors but all of the connectors should be of the same size.

It will be seen that since the individual connecting means 16 and 18 between the various elements 4, 6, 8, 10 and 12 of the overall float assembly are of a matched construction, any of the spherical elements 4, 6, 8, and 10 may be added or subtracted to provide a desired buoyant action. Regardless of which size spherical float or any combination thereof is used, the line anchoring assembly 12 may be conveniently attached thereto.

The elongated shape of the float assembly provides an excellent signal on the occurrence of a strike. While the float assembly will normally lie on its side in the water, upon being activated by a strike, the float will jump to an erect position wherein the mast head may be an appreciable length out of the water. This elevated position above the water coupled with a substantial wobbling action provides an exceptionally effective signal. Extensive wobbling action of the float results from a low relative placement of the center of gravity and a single pole connection, i.e. connection of but one pole of the float assembly to the fishing line. Of course, should but one of the spherical float members 4, 6 or 8 be used in conjunction with the mast 10 and the anchor assembly 12, the overall float will be maintained in a generally vertical position during the fishing operation but such an abbreviated float arrangement will, nevertheless, provide an extensive wobbling action.

Referring to FIGURE 2, the spherical members 4, 6 and 8 comprise two plastic hemispherical shells 20 and 22 cemented together at a waterproof butted and lapped joint 24. While the spherical members may be preferably of a hollow plastic construction it will be appreciated that light metal, wood or cork may be utilized in the float construction.

The anchor assembly 12 comprises a tubular housing 26 having a bore 28 through the length thereof, this bore including a reduced diameter portion 30 for fixedly receiving and holding the hook element 14 and an enlarged portion 31 for receiving a compression spring 32. Also positioned in the enlarged portion 31 is a plunger-like sleeve member 34 having a shoulder portion 35 and a bore 36 provided with an enlarged portion 38 to receive the stem 40 of a plunger 42. The plunger 42 also has a bore 44 and is further provided with a cap 46. As shown in FIGURE 4, the face 47 of the cap 46 includes approximately twelve peripherally positioned fishing line receiving notches 48 and two recesses 50 and 52 of varying depth, recess 50 being the more shallow. Positioned between the sleeve 34 and the plunger 42 on the stem 40 of the plunger 42 are two resilient washer-like elements 54. While the elements 54 are preferably neoprene O-rings, it will be appreciated that any rubber-like or resilient and non-abrasive material may serve as the line cushioning element.

The elements of the anchor assembly 12 are resiliently connected by a hook element 14 so as to permit longitudinal movement with respect to one another. The hook element 14 includes a long shank 56 having an enlarged end 57, a horizontal leg or bight portion 58 and a short leg 60. The leg 60 is of a length substantially equal to the depth of recess 52 but greater than the depth of recess 50. The enlarged end 57 is fixed to the housing 26 but the long shank 56 is rotatably and slidably directed through the respective bores of the sleeve 34 and plunger 42. In this manner, the stem 40 of the plunger 42 is resiliently retained in the enlarged portion 38 of the bore 36 of the sleeve 34 and the sleeve 34 is resiliently retained in the enlarged portion 31 of the bore 28 of the housing 26, against the action of spring 32.

To attach the float to a fishing line in a fixed position, the plunger member 42 is depressed by compressing the spring 32 in the housing 26, sliding the plunger along hook element 14, and, at the same time, aligning a short leg 60 of the hook element 14 with the deep recess 52 in the cap 46. Upon so positioning the hook element and slipping a fishing line under the horizontal leg 58 of the hook 14, the plunger 42 is released and allowed to slide axially along the hook element as urged by the spring 32, thereby seating the short leg 60 of the hook element 14 in the deep recess 52 and clamping the fishing line between the horizontal leg 58 of the hook element 14 and the cap 46 of the plunger 42. In this position the float will remain relatively fixed to the line.

While such a fixed relationship between the float and the line presents no particular problems when the distance between the float and the baited hook is small and, in fact, is required for bait depth control and casting convenience, this fixed relationship is inconvenient when the distance between the float and the hook exceeds the length of the fishing rod. In such an instance, the fixed float prohibits reeling-in of the line to the degree necessary for convenient fish landing or bait manipulation because after the float strikes the rod tip no further reeling is possible even though much line may still remain between the float and the bait and the bait and the rod tip. It is therefore desirable that provision be made to anchor the float relative to the line during the casting and fishing stages but to permit the float to automatically slide along the line upon abutting the rod tip.

To accomplish this condition, in attaching the line to the float, the plunger 42 is depressed as previously described but the cap element 46 is rotated relative to the hook element 14 to align the short leg 60 of the hook element 14 with the shallow recess 50. Upon releasing the plunger 42 the spring 32 causes the plunger to slide along the hook element 14 until the short leg 60 of the hook element is bottomed in the shallow recess 50. In this position clearance remains between the face of the cap 46 and the horizontal leg 58 of the hook element 14 and a line positioned within the guide formed by the hook element and the cap face is free to slide therethrough.

To clamp the float relative to the line during the casting and fishing operation, it is merely necessary to direct the line across one of the twelve grooves 48 cut in the periphery of the cap 46 and subsequently wrap the line about the side by side abutment of the two O-rings 54. After one full wrap is completed, a slight pull on the line will draw the line inwardly between the two O rings 54 so as to frictionally anchor the line. However, upon reeling-in the line to the point where the float abuts the tip of the fishing rod 64, if the reeling operation is continued, the line will be caused to unwrap from between the two O rings 54 and upon complete unwrapping, the line will be free to slide through the guide formed by the hook element 14 and the face of the cap 46. In this manner, the float is clamped or anchored to the line during the casting and fishing operations but is automatically freed upon striking the rod tip and therefore does not interfere with the complete reeling-in of the line.

Shown in FIGURE 5 is a modification of the anchor assembly wherein a cap 46a of a plunger 42a and a shoulder portion 35a of a sleeve member 34a are provided with grooves 55a and 55b, respectively. The function of these grooves is to stabilize the O rings 54a so as to reduce distortion of the same as the line L is pulled or unwrapped from therebetween. In other respects, this modified form plunger and sleeve member are like the previously described plunger 42 and sleeve member 34 in structure and function.

It will be noted that since the line is anchored relative to the float between two rubber O rings, the line is frictionally held but protected against abrasive action during unwrapping and disengagement. As will be appreciated, this cushioning effect adds appreciably to the life of a coated or treated fishing line by eliminating attrition of the line by the clamping elements. Any usual diameter fishing line may be wrapped between the rubber O rings due to the expandable resilient connection of sleeve member 34 to the plunger 42.

Since the tapered stud 16 of the housing member 26 of the anchor assembly 12 may be received and held by any of the recesses 18 of the spherical floats 4, 6 and 8 or mast 10, the anchor assembly 12 provides a convenient line attaching means for any single float or mast element or any combination thereof. The buoyancy effect of the float assembly may be adjusted, the positioning of the float assembly relative to the line may be changed, and the float held in either a fixed or a temporarily fixed condition relative to the line and yet will not interfere with a complete reeling-in of the fishing line.

It should be understood that the specific description of the structure set forth above may be departed from without departing from the spirit of this invention as disclosed in the specification and defined by the appended claims.

Having now described my invention, I claim:

1. A fishing float including an anchoring assembly adapted to fasten a fishing line thereto, said anchoring assembly comprising a housing; sleeve means aligned longitudinally and slidable with respect to the housing; plunger means aligned longitudinally with respect to the sleeve means; a hook element extending through the housing, the sleeve means and the plunger means, said hook element having a hook portion; the hook portion adapted to be positioned in either a deep recess or a shallow recess in the plunger means; a pair of resilient rings in snug engagement coaxially aligned between the plunger means and the sleeve means; and spring means engaging the housing and urging the plunger means against the hook portion; said fishing line adapted to be clamped between the hook portion and the plunger means when the hook portion is in the deep recess, or adapted to pass loosely between the hook portion and the plunger means when the hook portion is in the shallow recess so that the fishing line may be wrapped around and fastened to the anchoring assembly between the rings but disengageable therefrom upon pulling of the fishing line with respect to the anchoring assembly.

2. A fishing float as defined in claim 1 including a buoyant float member and wherein the housing of said anchoring assembly is provided with connecting means for releasably engaging the anchoring assembly with said buoyant float member.

3. A fishing float comprising a plurality of separate buoyant float members, each of said float members having a pair of engageable connecting means disposed at opposite extremities thereof, said float members being connectable together one to the other in a line to form an enlongated buoyant floating assembly wherein one connecting means of one float member is engaged with the corresponding connecting means of the adjacent float member, a separate elongated line attaching member extending colinear with the plurality of float members, said line attaching member having engageable connecting means at one end engaged with the connecting means of the float member at one end of the buoyant floating assembly and having means at the opposite end for attaching a fishing line to the fishing float, said line attaching means including means for receiving and resiliently holding the line in wrapped-around relationship on the line attaching member and also including hook means for attaching the floating assembly to the line and selectively movable to different positions to allow or to prevent relative movement between the floating assembly and the line, and a separate elongated mast, said mast having engageable connecting means at one end engaged with the connecting means of the float member at the end of the buoyant floating assembly opposite from the line attaching member, said mast extending colinear with the plurality of float members and said line attaching member.

References Cited by the Examiner

UNITED STATES PATENTS

| | | | |
|---|---|---|---|
| 479,218 | 7/92 | Koppenhofer | 24—127 X |
| 2,481,346 | 9/49 | Rigby | 43—44.95 X |
| 2,895,255 | 7/59 | Irwin | 43—44.95 X |
| 2,962,831 | 12/60 | Cameron | 43—43.1 X |
| 3,081,575 | 3/63 | Meisner | 24—127 X |
| 3,102,359 | 9/63 | Cahill et al. | 43—43.14 |

ABRAHAM G. STONE, *Primary Examiner.*